C. H. THOMPSON.
Dies for Making Landsides for Plows.
No. 164,664.  Patented June 22, 1875.
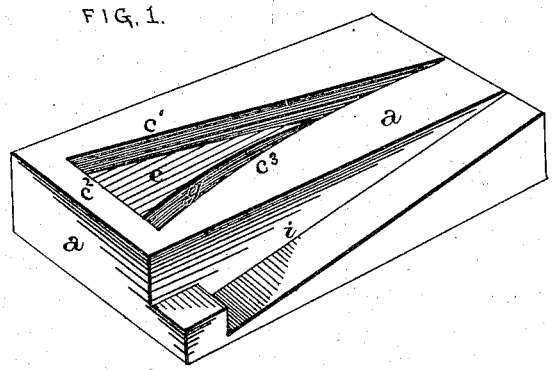
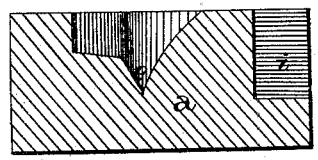
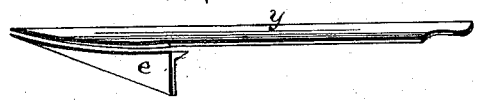
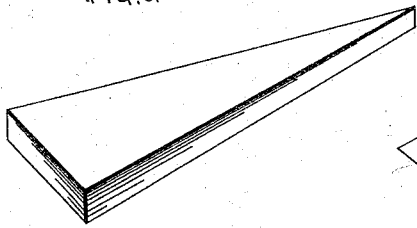
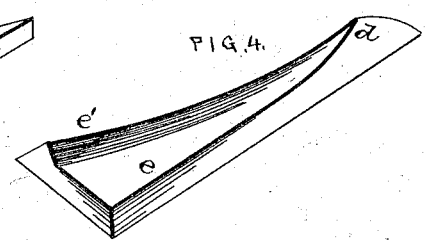
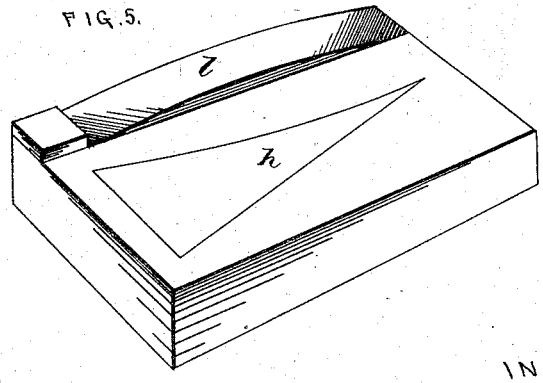
WITNESSES.
F. B. Townsend.
E. T. Kaiser.
INVENTOR.
C. H. Thompson
per
F. A. Lehmann,
atty.

UNITED STATES PATENT OFFICE.

CHARLES H. THOMPSON, OF MOLINE, ILLINOIS.

IMPROVEMENT IN DIES FOR MAKING LAND-SIDES FOR PLOWS.

Specification forming part of Letters Patent No. 164,664, dated June 22, 1875; application filed June 3, 1874.

*To all whom it may concern:*

Be it known that I, CHARLES H. THOMPSON, of Moline, in the county of Rock Island and State of Illinois, have invented certain new and useful Improvements in Dies for Land-Side; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in dies for land-sides; and it consists in the construction of dies for shaping the point of the land-side, and also for welding the point to the share after the point is formed, as will be more fully described hereafter.

The accompanying drawings represent my invention, in which $a$ represents the bed-block having an elongated triangular recess, $c$, formed in its top, the two sides $c^1$ $c^2$ of which are straight, while the longest one, $c^3$, is made slightly curved. Beginning at the wide end, the recess gradually deepens until near the sharp end, where it suddenly deepens, so as to form the point $d$ of the land-side $e$. In the bottom of the recess, along the curved side, is formed a triangular groove, $g$, which forms a similarly-shaped ridge, $e'$, upon the upper inner edge of the land-side. A triangular heated plate is placed on the die, when, by a single stroke of the block $h$, the land-side point $e$, with ridge $e'$, is formed.

After the land-side has been thus stamped it is heated to a welding-heat, and then placed in the recess $i$ in the side of the block $a$, which recess is made much deeper at one end than the other, so as to correspond with the shape of the land-side. As this land-side stands in this recess, with the flange $e'$ upon its upper outer edge, the front end of the share $y$, which has also been heated to a welding-heat, is laid upon the top edge of the land-side, when the upper part of the die $h$ descends upon them, and welds them securely together. Upon the edge of the die $h$ that descends upon these two parts is formed the curved slanting flange $l$, which is so shaped as to correspond with the curved form of the land-side and share.

Having thus described my invention, I claim—

1. Dies for forming land-sides, constructed with the herein-described recess for making the land-side and the recess and raised ridge $i$ $l$ upon the die and die-head, respectively, for welding the land-side formed in the first-named recess to the share, substantially as shown and set forth.

2. The die $a$, having the recess $c$ and triangular groove $g$, extending along the curved side of said recess $c$ for forming a raised flange on the side of the land-side, substantially as herein shown and specified.

In testimony that I claim the foregoing I have hereunto set my hand this 26th day of May, 1874.

CHARLES H. THOMPSON.

Witnesses:
EUGENE LEWIS,
JOHN VANLURANEE.